Sept. 16, 1947.  G. A. DRUCKER  2,427,554
NEGATIVE CARRIER
Filed Feb. 16, 1945  2 Sheets-Sheet 1
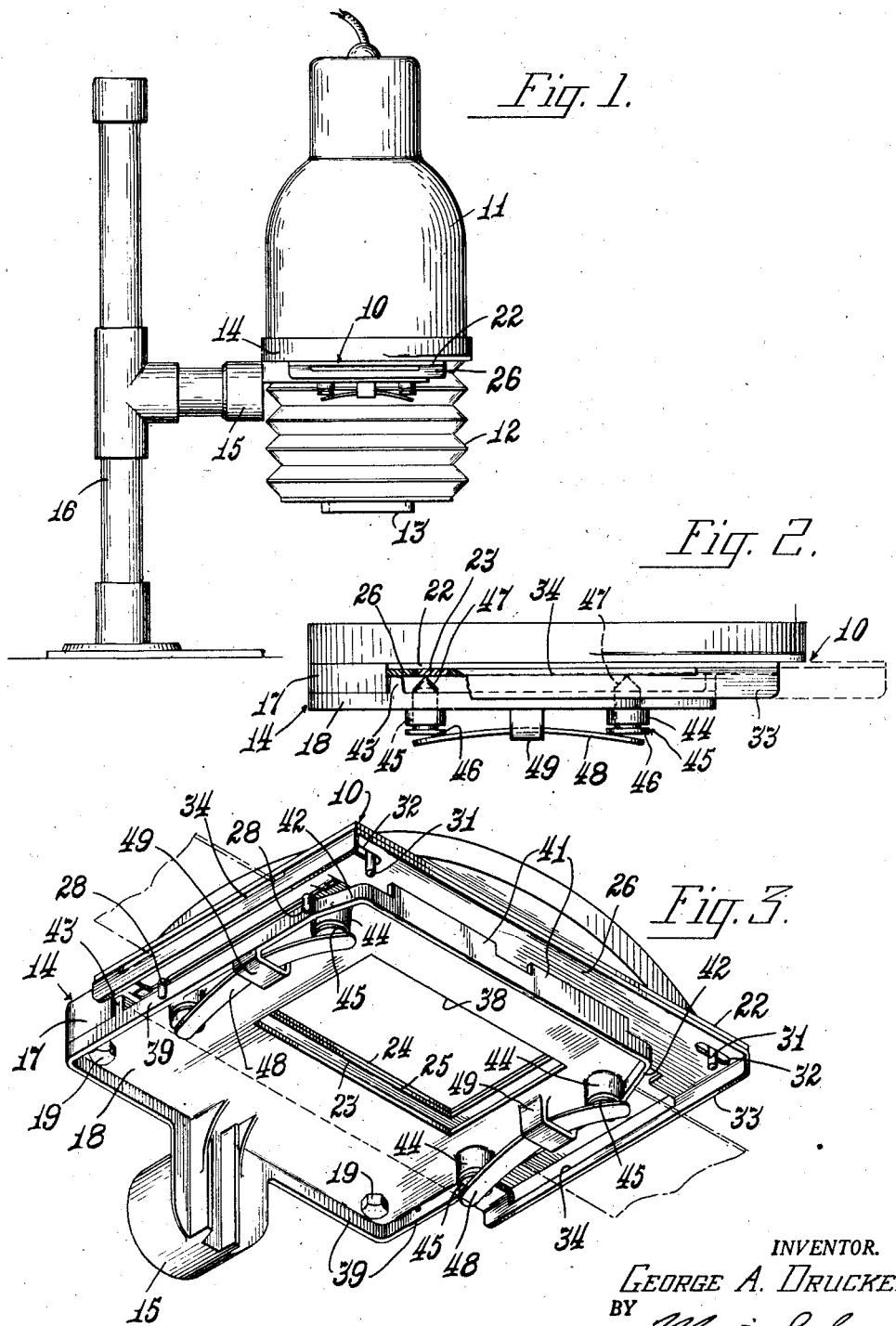
INVENTOR.
GEORGE A. DRUCKER
BY
ATTORNEY Sept. 16, 1947.     G. A. DRUCKER     2,427,554
NEGATIVE CARRIER
Filed Feb. 16, 1945     2 Sheets-Sheet 2
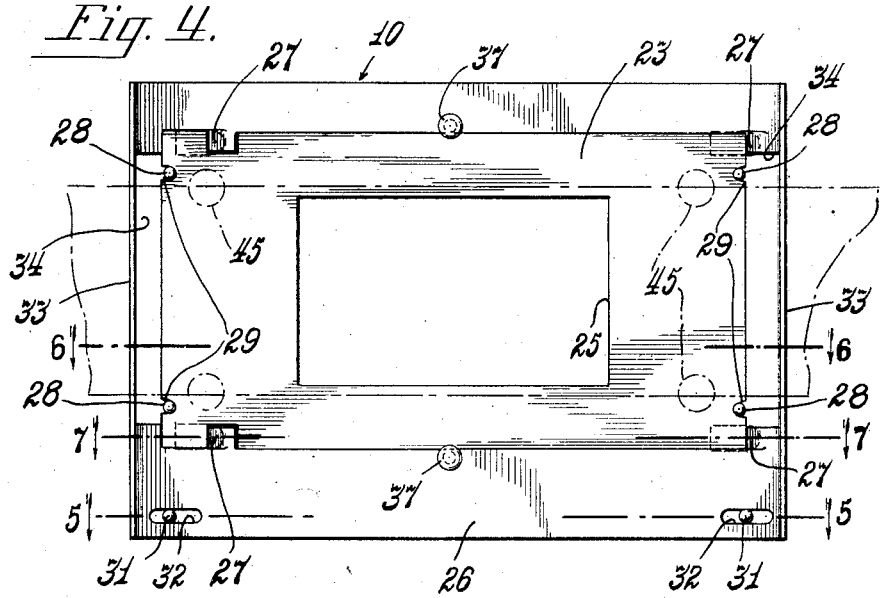
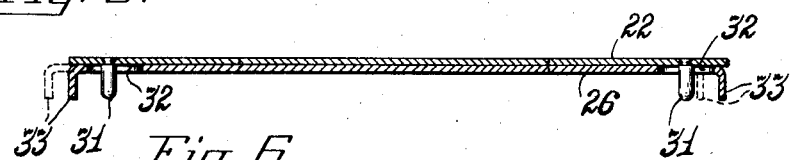
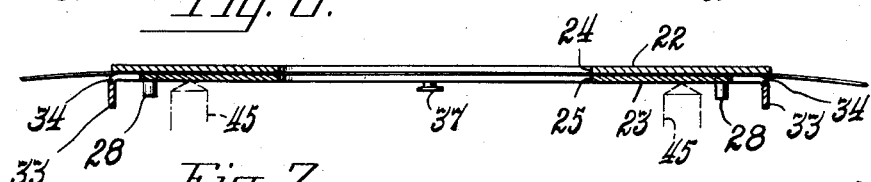
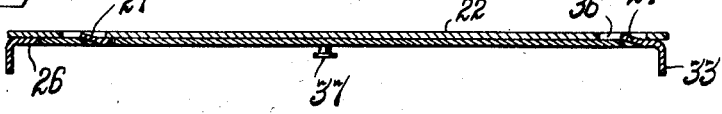
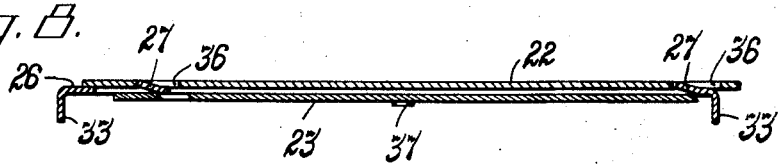
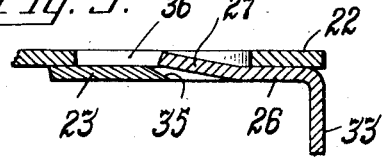
INVENTOR.
GEORGE A. DRUCKER
BY
ATTORNEY Patented Sept. 16, 1947

2,427,554

UNITED STATES PATENT OFFICE 2,427,554

NEGATIVE CARRIER

George A. Drucker, Chicago, Ill.

Application February 16, 1945, Serial No. 578,259

2 Claims. (Cl. 88—24)

The invention relates to improvements in negative or film carriers for photographic apparatus and is more particularly concerned with an improved carrier especially adapted for use in enlarging cameras or like apparatus and of a kind which will permit accurate repositioning of a negative or film in the carrier without removing the carrier from the camera.

Known types of negative carriers such as carriers of the kind disclosed in Worlatschek Patent No. 2,207,211, dated July 9, 1940, are of such construction that, although permitting changes to be made in the position of the negative or film in the manner aforesaid, they frequently scratch or otherwise mar the emulsion on the film and further tend to cause sliding movement of the negative or film while clamping the repositioned negative or film. Such shifting movement of the negative after positioning requires special attention for correcting, otherwise improper registration and defective reproductions may result. It is, therefore, an object of the present invention to provide a negative carrier of the character described which is constructed and assembled for operation in such manner as to eliminate the probability of scratching the film and also prevent inadvertent movement of the positioned negative or film during the clamping operation.

Another object of the invention is to provide a film carrier which is inexpensive to manufacture, easy to assemble and arrange in a photographic apparatus, simple to operate, and very efficient.

Negative carriers of the kind embodying features of the present invention include movable plates adapted for clamping a negative or film therebetween, and it is an object of the present invention to provide novel means for effecting positive and uniform lateral separation of said plates, without relative edgewise movement, for a distance sufficient to enable the negative or film to be moved without becoming scratched and be accurately repositioned with respect to the exposure apertures provided in said plates.

Other and further objects of the present invention will be apparent from the following description and claim and are illustrated in the accompanying drawings which, by way of illustration, show a preferred embodiment and the principle thereof and which is considered to be the best mode contemplated for applying that principle. Other embodiments of the invention embodying the same or equivalent principle may be used and structural changes may be made as desired by those skilled in the art without departing from the present invention and purview of the appended claims.

In the drawings:

Fig. 1 is a side elevational view of an enlarging apparatus showing a negative carrier, embodying the features of the present invention, arranged therein.

Fig. 2 is an enlarged detail side elevational view of a portion of said enlarging apparatus, showing the negative carrier therein and partly broken away to illustrate the construction thereof.

Fig. 3 is a perspective detail view of the holder frame forming a part of the enlarging apparatus and showing the negative carrier mounted therein.

Fig. 4 is an inverted plane view of the negative carrier.

Fig. 5 is a sectional detail view of the negative carrier taken on line 5—5 of Fig. 4.

Fig. 6 is a sectional detail view taken on line 6—6 of Fig. 4.

Fig. 7 is a sectional detail view taken on line 7—7 of Fig. 4.

Fig. 8 is a sectional view like that shown in Fig. 7, except that the plates of the negative carrier are shown in an adjusted or spaced apart position.

Fig. 9 is an enlarged detail sectional view of a fragment of the negative carrier as viewed in Fig. 7.

The negative carrier 10 embodying the features of the present invention is shown in Figs. 1 to 3 of the accompanying drawings as mounted in a photographic enlarging apparatus consisting of the usual lamp housing 11, bellows 12, and lens 13. The negative carrier is removably held in position between the bellows 12 and lamp housing 11, a holder 14 being provided to accommodate the negative carrier. The holder 14 may include a suitable mounting boss 15 whereby the enlarging apparatus may be attached to a standard 16 for adjustment vertically. The holder 14 is, in the present disclosure, suitably formed of two substantially plate-like members 17 and 18 firmly joined together adjacent one edge by means of securing screws 19 so as to provide therebetween, a mounted or slotted opening which extends inwardly from the front edge thereof throughout its entire width to receive the negative carrier 10 when the latter is located and secured therein in a manner to be described presently.

The negative carrier 10, best illustrated in Figures 4 to 9 inclusive, consists of three main elements, fashioned from sheet material, which cooperate one with the other to provide the means required to hold and effect selective clamping and release of a film or negative when the latter is properly positioned therein. The negative carrier includes a substantially rectangular base plate 22 and a rectangular pressure plate 23, the latter being of a size substantially less than the over all dimensions of the base plate 22. Each of these plates is provided with an exposure aperture 24 and 25 respectively, which apertures are adapted to register one with the other at all times. A rectangular frame 26 having outside dimensions substantially identical to those of the base plate 22 is arranged against the bottom face of said base plate. This frame 26 is suitably cut away to provide a rectangular opening inwardly of its edges of sufficient size to snugly fit around the pressure plate 23 when the latter is properly located therein and in face to face contact with the bottom face of the base plate 22.

In use, the negative or film is threaded between the base plate 22 and pressure plate 23 so that portions thereof may be successively located within the area of the exposure apertures 24 and 25. When the plates 22 and 23 are in substantial face to face abutment, as best shown in Figure 6, the negative or film is firmly engaged between said plates and, by reason of pressure applied to one of said plates in a manner to be described presently, said negative or film is firmly clamped therebetween so as to prevent its being shifted.

After an exposure has been made of the portion of the negative or film located within the area of the exposure apertures 24 and 25, the negative or film is shifted so as to locate a succeeding portion of the negative or film within said area. Accordingly, means is provided whereby the base plate 22 and pressure plate 23 may be moved apart a limited distance to free the negative or film so that it may be easily moved into the desired position of adjustment. To accomplish this, the frame 26 is provided with means preferably in the form of a plurality of cam surfaces 27 each of which is disposed in close abutment with an edge of the pressure plate 23. Upon sliding movement of the frame 26 in a direction to carry the cam surfaces 27 towards such edges, said surfaces ride under said edges and rest beneath the pressure plate 23 and the latter will have been moved laterally thereby in a direction away from the film or negative so as to leave a gap or sufficient breadth between the plates 22 and 23 to enable the negative or film to be moved easily into a new position.

A feature of the construction of the negative carrier, insofar as it has been described hereinabove, resides in the fact that the plates 22 and 23 which, while in clamping position bear against the face of the negative or film, are moved away from each other without edgewise sliding. This mode of separation is effected in the present construction by providing suitable guide pins 28 on the bottom face of the base plate 22 which depend therefrom and coact with registering notched recesses 29 provided in opposite ends of the pressure plate 23. When the plates are moved relative to one another the pressure plate 23 rides along the pins 28 and relative edgewise shifting of said plates in any direction is prevented.

The base plate 22 is also provided with depending pins 31 adjacent one edge. These pins extend through registering slots 32 in the frame 26 primarily for a purpose to be described presently but they serve also as means for guiding and limiting edgewise shifting of a frame 26 relative to the base plate 22. The frame 26 has each end formed with a down-turned lip or flange 33 coextensive with its width which are suitably cut away as at 34, best shown in Figure 6, to enable threading of the negative or film between the plates 22 and 23 without the film contacting in any manner whatsoever either the frame 26 or its end flanges 33.

Shifting of the frame 26 edgewise with respect to the base plate 22 in the manner described hereinabove to cause separation of the plates 22 and 23 may best be effected by gripping the pin 31 and end flange 33 on the right-hand end of the frame, as viewed in Figures 4 and 5, and squeezing said pin and flange together as illustrated in dotted lines in Figure 5. Movement of the frame from the full line to the dotted line position shown in Figure 5 carries the cams 27 from the ineffective position illustrated in Figures 4 and 7 into the effective position shown in Figure 8. It will be noted upon reference to Figure 9 that the edge of the pressure plate 23 engaged by a related cam 27 is suitably inclined as at 35 to facilitate smooth unobstructed movement of the cam 27 beneath the plate 23. After the plates have been separated and the negative or film has been repositioned, the pin 31 and flange 33 at the left-hand end of the negative carrier, as viewed in Figures 4 and 5, are grasped and squeezed together thereby returning the frame 26 to its initial full line position (Figure 5) whereby the cam elements 27 are carried out from behind the plate 23 and said plate may then move upwardly without edgewise sliding into clamping engagement with the repositioned film.

The base plate 22 is provided with openings 36 one in register with each cam member 27 so as to provide the necessary clearance for the movement of said cam members into their various positions when the frame 26 is shifted from one position to the other. If desired, headed pins 37 may be carried on and depend from the frame 26 closely adjacent to the inner edges thereof so as to dispose the heads of said pins over the side margins of the pressure plate 23 to thereby prevent said pressure plate from dropping out of position easily when the negative carrier is removed from the photographic apparatus.

The holder 14 of the photographic apparatus is suitably provided with a means to urge the pressure plate 23 into tight clamping relationship with the base plate 22 when the negative carrier is located therein in the manner best shown in Figures 2 and 3. The upper member 17 of the holder 14 is provided with the suitable annular flange or other means for attachment of the lamp housing 11 of the photographic apparatus. The other or lower member 18 thereof has a central rectangular opening 38 therein for alignment with the exposure apertures 24 and 25 of the negative carrier. The member 18 also includes a reinforcing surrounding flange 39 having upwardly extending parts 41 on the front or entrance side of the holder for a purpose to be described presently, and its side portions preferably are inclined forwardly towards one another as at 42, at said entrance end, so as to facilitate the positioning of the negative carrier into the space provided therefor between the members 17 and 18. It will be noted upon viewing the disclosure in Figure 3, that the lower member 18 is of a width substantially equal to the longitudinal spacing between the depending guide pins 28 on the negative carrier 10 so that said pins will snugly embrace the flange 39 to insure registration of its exposure apertures with the opening 38 in said member. The lower holder member 18 also has an upwardly directed flange 43 extensive with its width and adjacent to its rear edge.

The flange 43 and the parts 41 previously referred to, each are of such height as to contact the bottom face of the frame 26 when the negative carrier 10 is in place, to thereby hold said frame firmly against the bottom face of the base plate 22 of said carrier which in turn is held firmly against the bottom face of the upper holder member 17.

The bottom member 18 includes also, spaced pairs of bosses 44 each of which provides a guide bearing for a pin 45 best shown in Figure 2. Pins 45 are each provided with a head 46 and they are of such length as to extend upwardly into the opening receiving the negative carrier and their upwardly disposed ends preferably are inclined as at 47 so as to facilitate easy insertion of the negative carrier in position within the opening without undue resistance. The pins 45 are adapted to be retained under spring tension upwardly so as to bear firmly against the bottom face of the pressure plate 23 when the latter is properly located with respect thereto and to this end each pair of pins 45 is engaged by a leaf spring 48 firmly anchored intermediate its ends as by straps 49 preferably formed integral with the member 18, one between each pair of bosses 44.

In use, the negative carrier 10 is withdrawn from the holder 14 and the plates 22 and 23 are separated. The negative or film is then laid across one of the plates and the other plate is placed in position thereover so that the negative or film will lie between said plates and between the pairs of guide pins 28. The frame 26 is then arranged in place and the negative carrier is then fitted into the holder 14 with the flanges 33 on said frame extending downwardly. During insertion of the carrier into the holder the pins 45 are forced downwardly against the tension of their springs 48. When the negative carrier is properly positioned within the holder 14, the frame 26 will rest upon flanges 41 and 43 and the pins 45 will bear upwardly against the plate 23 to firmly clamp the film in position. After an exposure has been taken and the position of the negative or film is to be changed the plates 22 and 23 are, as aforesaid, moved apart by gripping and squeezing together the selected pin 31 and related flange 33 to carry the cam elements 27 behind the pressure plate 23 whereupon said plate is moved downwardly and held in spaced relation to the film and said film may be easily moved and properly repositioned. When the frame 26 is returned to its initial position to carry the cams 27 out from behind the plate 23, the springs 48 acting on the pins 45 will move the plate 23 upwardly to again clamp the film and secure it against further movement. It will be observed that there is not the slightest edgewise movement of either of the plates 22 or 23 during the freeing or clamping operation hereinabove described, consequently the negative or film is clamped firmly in the precise position to which it had been adjusted and consequently accurate reproduction of the subject matter thereof is insured.

Although a preferred form of the invention has been described hereinabove and disclosed in detail in the accompanying drawings, it should be noted that the invention is capable of embodying the wide variety of modifications in detail structure and that the negative carrier may be used in association with photographic apparatus other than the kind disclosed herein without departing from the spirit of the invention or the scope of the appended claims.

I claim:

1. A negative carrier of the character described embodying two plates provided with registering exposure apertures and between which plates a negative is to be clamped, one of said plates being larger than the other so as to expose the margins of the larger plate, pins on one of said plates coacting with the other plate to prevent shifting of said plates edgewise one relative to the other but permitting movement of said plates towards and away from each other, means yieldingly clamping the plates together, a rectangular frame apertured to receive the smaller plate in the aperture and arranged to lie against the exposed margins of the larger plate, means on the frame and on the larger plate engageable to move the frame edgewise relative to the plates, cam surfaces on the smaller of said plates, and cam elements on the frame arranged for coaction with said cam surfaces in response to edgewise shifting of the frame in one direction for separating the plates to permit a negative to slide freely between said plates.

2. A negative carrier of the character described embodying two plates provided with registering exposure apertures and between which plates a negative is to be clamped, one of said plates being larger than the other so as to expose the margins of the larger plate, pins on one of said plates coacting with the other plate to prevent shifting of said plates edgewise one relative to the other but permitting movement of said plates towards and away from each other, means yieldingly clamping the plates together, a rectangular frame apertured to receive the smaller plate in the aperture and arranged to lie against the exposed margins of the larger plate, means on the frame and on the larger plate engageable to move the frame edgewise relative to the plates, cam surfaces on the smaller of said plates, and cam elements on the frame normally lying in the plane of the smaller plate arranged for coaction with said cam surfaces in response to edgewise shifting of the frame in one direction for separating the plates to permit a negative to slide freely between said plates.

GEORGE A. DRUCKER.

REFERENCES CITED

The following references are of record in the file of this patent:

UNITED STATES PATENTS

| Number | Name | Date |
| --- | --- | --- |
| 600,688 | Goodwin | Mar. 15, 1898 |
| 2,260,672 | Johanson | Oct. 28, 1941 |
| 2,153,159 | Schubert | Apr. 4, 1939 |
| 2,207,211 | Worlatschek | July 9, 1940 |
| 2,388,240 | Appling | Nov. 6, 1945 |

FOREIGN PATENTS

| Number | Country | Date |
| --- | --- | --- |
| 647,224 | Germany | June 30, 1937 |